United States Patent [19]
Iwai et al.

[11] Patent Number: 5,555,548
[45] Date of Patent: Sep. 10, 1996

[54] METHOD AND APPARATUS FOR TRANSFERRING DATA BETWEEN A MASTER UNIT AND A PLURALITY OF SLAVE UNITS

[75] Inventors: Takumi Iwai, Osaka; Mikiko Tamori, Kawasaki, both of Japan

[73] Assignee: Fjuitsu Limited, Kanagawa, Japan

[21] Appl. No.: 99,198

[22] Filed: Jul. 29, 1993

[30] Foreign Application Priority Data

Oct. 23, 1992 [JP] Japan .................................. 4-286114
Jul. 15, 1993 [JP] Japan .................................. 5-175604

[51] Int. Cl.$^6$ ................................ H04L 7/00; B42J 27/12
[52] U.S. Cl. ................ 375/356; 395/200.05; 395/200.19
[58] Field of Search .................................. 375/356, 377; 370/103, 61, 94.2, 112; 379/100; 358/400; 395/200.05, 200.19, 200.01

[56] References Cited

U.S. PATENT DOCUMENTS

| | | | |
|---|---|---|---|
| 4,047,158 | 9/1977 | Jennings | 395/275 |
| 4,405,951 | 9/1983 | Omori et al. | 358/400 |
| 4,410,917 | 10/1983 | Newdoll et al. | 360/15 |
| 4,454,577 | 6/1984 | Costantini et al. | 395/200 |
| 4,615,029 | 9/1986 | Hu et al. | 370/89 |
| 4,677,614 | 6/1987 | Circo | 375/107 |
| 4,860,285 | 8/1989 | Miller | 370/100 |
| 5,166,675 | 11/1992 | Amemiya et al. | 340/825.08 |
| 5,237,322 | 8/1993 | Heberle | 375/107 |
| 5,349,673 | 9/1994 | Yasuda | 395/700 |

FOREIGN PATENT DOCUMENTS 61-56541  3/1986  Japan .
3143047  6/1991  Japan .

*Primary Examiner*—Kim Yen Vu
*Assistant Examiner*—Madeleine Anh-Vinh Nguyen

[57] ABSTRACT

In a method and apparatus for transferring data between a master unit MU, and slave units SU0, SU1 . . . SUX according to a synchronizing signal generated by the master unit MU, the master unit MU outputs information specifying a unit to be a data transferring source, and the unit corresponding to that information transmits data held by the unit itself and the other units so that, data transferring is performed between the units MU, SU0, SU1 . . . and SUX, and it becomes possible for all the units including the master unit to receive data from the data transmitting source.

5 Claims, 13 Drawing Sheets

Fig. 6

| ADDRESS | DATA |
|---|---|
| 0 | 00000(0) |
| 1 | 00001(1) |
| 2 | 00010(2) |
| . | . . . . . . |
| 30 | 11110(30) |
| 31 | 11111(31) |

Fig. 7

| ADDRESS | DATA |
|---|---|
| 0 | 00000(0) |
| 1 | 00001(1) |
| 2 | 00010(2) |
| · | · · · · · · |
| 14 | 01101(14) |
| 15 | 01111(15) |
| 16 | 00000(0) |
| 17 | 10000(16) |
| 18 | 10001(17) |
| · | · · · · · · |
| 30 | 11101(29) |
| 31 | 11110(30) |

Fig. 11

| A B C D | QA QB QC QD |
|---------|-------------|
| 0 x x x | 0 1 1 1 |
| 1 0 x x | 1 0 1 1 |
| 1 1 0 x | 1 1 0 1 |
| 1 1 1 0 | 1 1 1 0 |
| 1 1 1 1 | 1 1 1 1 | x : DON'T CARE 5,555,548

1

METHOD AND APPARATUS FOR TRANSFERRING DATA BETWEEN A MASTER UNIT AND A PLURALITY OF SLAVE UNITS

BACKGROUND OF THE INVENTION

1. Field of the Invention

The present invention relates an an apparatus such as a digital exchanger, for example, in which a plurality of slave units are controlled by a master unit, and more particularly to a method and apparatus for transferring data such as alarm, status and so on between the respective units.

2. Description of Related Art

FIG. 1 is a schematic diagram of a communication apparatus such as a digital exchanger, for example, to which the present invention is applied.

The communication apparatus shown in FIG. 1 is composed of one master unit MU and four slave units SU0, SU1, SU2 and SU3, and the respective slave units SU0, SU1, SU2 and SU3 are controlled by the master unit MU to exchange telephone lines.

In addition, to the master unit MU, a computer MUc is connected through a cable CB and also to the respective slave units SU0, SU1, SU2 and SU3, computers are connected respectively.

FIG. 2 is a block diagram of configuration for explaining a data transferring method which has been conventionally performed between the master unit MU and the respective slave units SU0, SU1 ... and SUX in such a communication apparatus shown in the aforementioned FIG. 1.

The master unit MU and the respective slave units SU0, SU1 ... SUX are connected by signal lines L1, L2 and L3 respectively. Clock CLK is given from the master unit MU to the respective slave units SU0, SU1 ... and SUX through the signal line L1, and frame pulse FP is given through the signal line L2. And from the respective slave units SU0, SU1 ... and SUX to the master unit MU, transfer data TD is sent through the signal line L3.

To the respective slave units SU0, SU1 ... and SUX, data ID0, ID1 ... and IDX each specifying each of the units are given, for example, by a digital switch and the like, and the respective units store data D0, D1 ... and DX each data being status showing each state, alarm informing abnormal occurrence due to condition, and so on.

The master unit MU takes in data D0, D1 ... and DX each data being alarm, status and so on, held by the slave units SU0, SU1 ... and SUX and stores them in data memory MUa, and sends data in a data memory MUa to a computer MUc.

The computer MUc performs a necessary processing using or according to data having been taken in from the master unit MU.

FIG. 3 is a timing chart of a conventional method done by the configuration shown in FIG. 2, and it is a method disclosed as a prior art also, for example, in Japanese Patent Application Laid-Open No. 3-143047.

As aforementioned, the master unit MU gives clock CLK and frame pulse FP which makes predetermined cycles of the clock CLK as one cycle to the slave unit SU0, SU1 ... and SUX respectively through the signal lines L1 and L2.

The respective units SU0, SU1 ... and SUX send the data D0, D1 ... and DX, each data being status, alarm and so on held by each slave unit to the signal line L3 at a preset timing

2 in one cycle (one frame) of the frame pulse FP. To be concrete, making rising of the frame pulse FP as a base timing, a predetermined number of the following clock CLK (predetermined clock cycles) are allocated as a data output period of the respective slave units SU0, SU1 ... and SUX. The respective slave units SU0, SU1 ... and SUX. The respective slave units SU0, SU1, ... and SUX send the respective data D0, D1 ... and DX to the signal line L3 at the timing of the clock CLK allotted to them respectively.

According to the above-described method to the master unit MU, the transfer data TD obtained by time-division multiplexing the data D0, D1 ... and DX sent from the respective slave units SU0, SU1 ... and SUX is inputted one at a time at a cycle of one frame pulse FP.

Since the conventional data transferring method adopts such a method as aforementioned, data transferring from the master unit MU to the slave units SU0, SU1 ... and SUX, or data transferring between the slave units SU0, SU1 ... and SUX can't be performed, therefore there are problems that, status, alarm and so on of the master unit MU cannot be referred to at the slave units SU0, SU1 ... and SUX side, and each of the slave units SU0, SU1 ... and SUX cannot refer to status, alarm and so on of the other slave unit.

And at one cycle of the frame pulse FP, since data is sent from the respective slave units SU0, SU1 ... and SUX to the master unit MU respectively one at a time in a fixed order, in the case, for example, where order of data transfer is changed by giving priority orders to the slave units SU0, SU1 ... and SUX, or where data is required twice from one slave unit, while one time from the other slave unit because there is a difference in importance between the slave units SU0, SU1 ... and SUX, the conventional construction can't deal with such cases.

In the aforementioned Japanese Patent Application Laid-Open No. 3-143047, there is disclosed a method for setting priority orders to the slave units and allowing the slave unit having the highest priority order among the slave units each having a request for transmitting, to transmit data to the master unit. But, since the judgment of priority order of the slave units is performed by the master unit and judgment of whether or not the slave unit is allowed to transmit is performed by software, response time is required respectively.

SUMMARY OF THE INVENTION

The present invention has been devised to solve such inconveniences, and an object of the invention is to provide a method for data transferring, which enables each slave unit to receive status, alarm and so on of the master unit and other slave units by configuring so that a designated unit among all of the units also including the master unit becomes a data transmitting source and all of the other units can receive the data.

Another object of the invention is to provide a data transferring apparatus capable of transferring data after giving transmission allowance by hardware to a slave unit without response time, by allowing transmission requests from the slave units in a predetermined priority in the master unit.

The method for transferring data of the present invention is characterized by the fact that it is a method, wherein data transferring is performed between the respective units including the master unit according to synchronizing signal, that allows the master unit to output information specifying the unit which is to be a data transmitting source and allows the unit which corresponds to the aforesaid information to transmit data held by it, and allows the other units to take in the data, to perform data transferring between the units.

The data transferring apparatus of the present invention is characterized by a plurality of storing circuits for respectively storing transmission request signals representing transmission requests from the respective slave units, a transmission allowance signal generating circuit for generating a transmission allowance signal representing transmission allowance of one slave unit according to the stored contents of the plurality of the storing circuits and a predetermined priority order, a transmission request rewriting circuit for rewriting the stored content of the storing circuit storing the transmission request signal from a slave unit which has been allowed Lo transmit by the transmission allowance signal generating circuit, Lo be a stale where there is no transmission request, a detecting circuit for detecting a predetermined state obtained by rewriting all of the stored contents of a plurality of the storing circuits, to be a state where there is no transmission request, a selecting circuit for selecting either a rewriting operation executed by the transmission request rewriting circuit or a signal input operation causing the transmission request signals from a plurality of slave units to be stored in a plurality of storing circuits, and a control circuit for causing the selecting circuit to select the signal input operation only when said predetermined state is detected by the detecting circuit, and to select the rewriting operation when said predetermined state is not detected by the detecting circuit.

According to the present invention, by the fact that the master unit designates a unit which is to be a transmission source, data transferring can be performed from the designated unit to the other unit. Therefore, by designating a slave unit, data transferring between the slave units can be performed, and by designating the master unit itself, data transferring from the master unit to the slave units can be performed.

According to the present invention, the transmission request signal representing the transmission requests from the respective slave units are stored respectively in a plurality of the storing circuits, and according to those stored contents and a predetermined priority order, the transmission allowance signal which allows only one slave unit to transmit is generated by the transmission allowance signal generating circuit, as well as the stored content of the storing circuit storing the transmission request signal from the slave unit which has been permitted to transmit data, is rewritten by the transmission request rewriting circuit to be a state where there is no transmission request. And when a predetermined state, obtained by rewriting all of the stored contents of a plurality of the storing circuits to be a state where there is no transmission request, is detected by the detecting circuit, the signal input operation, causing the transmission request signal from the plurality of the slave units to be stored in the plurality of the storing circuits, is selected by the selecting circuit, and when a predetermined state is not detected, the rewriting operation executed by the transmission request rewriting circuit is selected by the selecting circuit.

The above and further objects and features of the invention will more fully be apparent from the following detailed description with accompanying drawings.

BRIEF DESCRIPTION OF THE DRAWINGS

FIG. 6 is a schematic diagram showing one example of stored contents of transmit numbers of ROM in a transmit number generating unit used in a data transferring method of the present invention;

FIG. 7 is a schematic diagram showing another example of stored content of transmit numbers of ROM in a transmit number generating unit used in a data transferring method of the present invention;

FIG. 11 is a schematic diagram showing a relationship between an input and an output of a transmission allowance signal generating circuit of a data transferring apparatus of the present invention;

DESCRIPTION OF THE PREFERRED EMBODIMENTS

Figure 1:
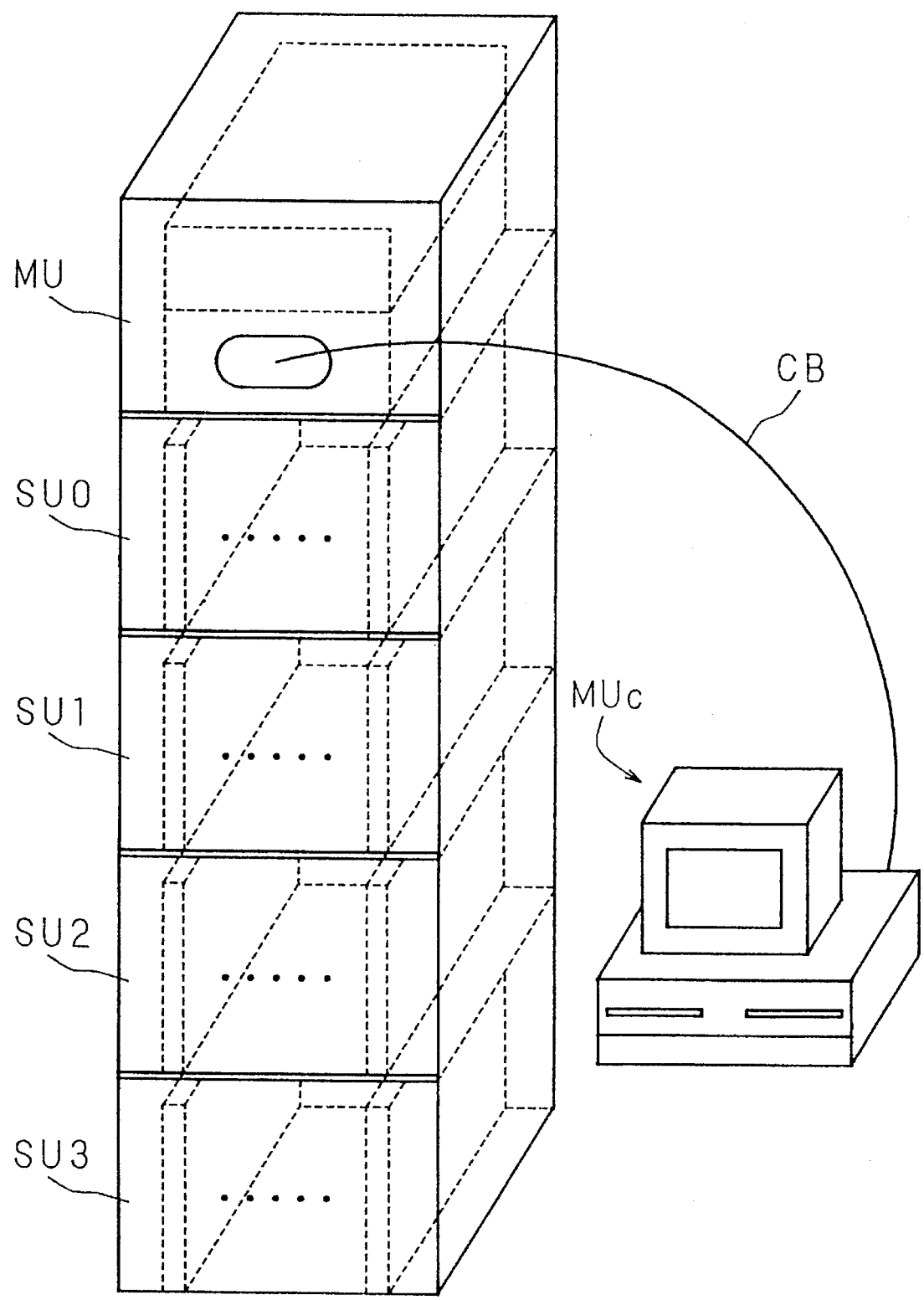
FIG. 1 is a schematic diagram of a connection apparatus such as, for example, a digital exchanger or the like to which the present invention is applied.
Figure 2:
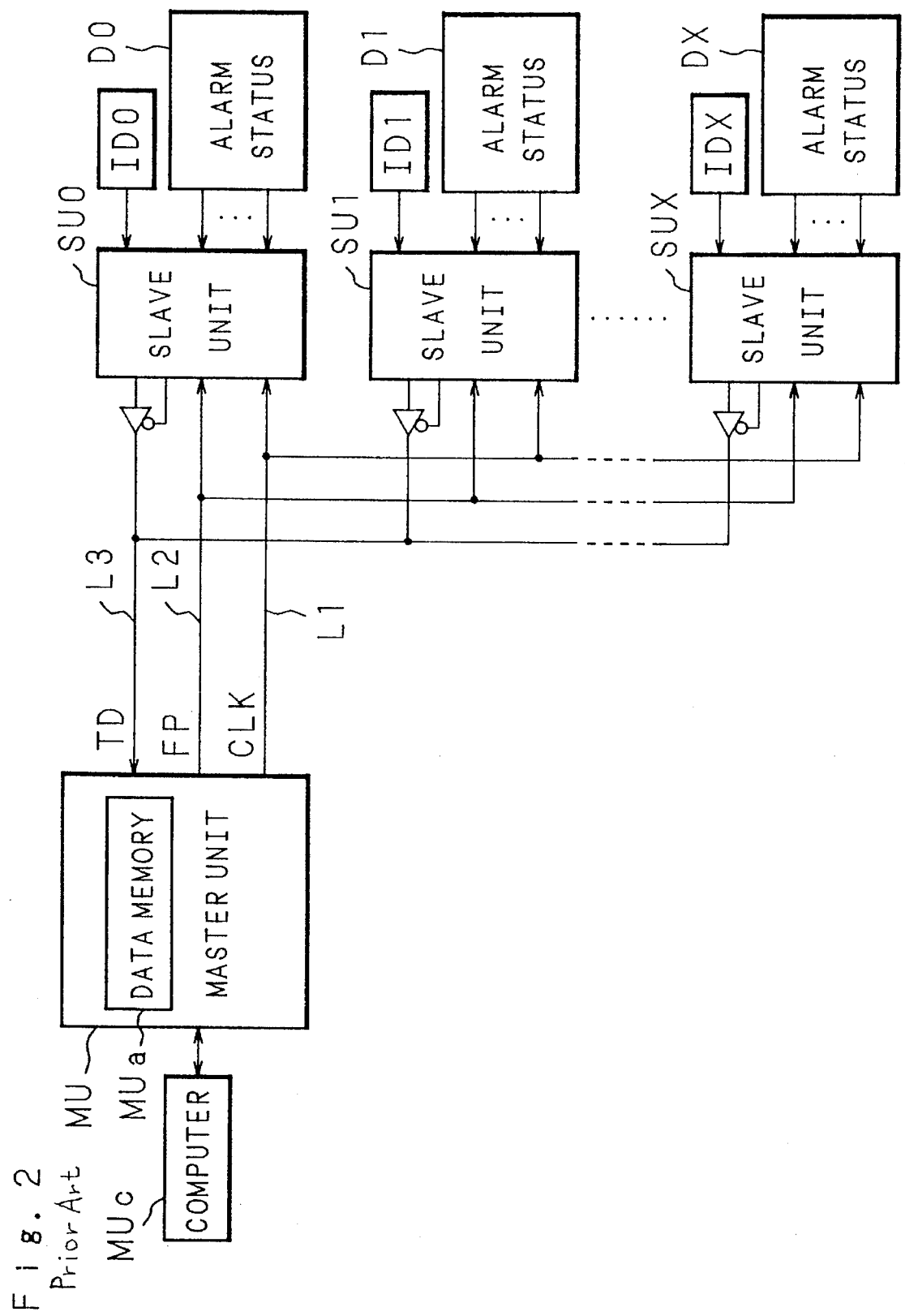
FIG. 2 is an explanatory block diagram of a conventional data transferring method.
Figure 3:
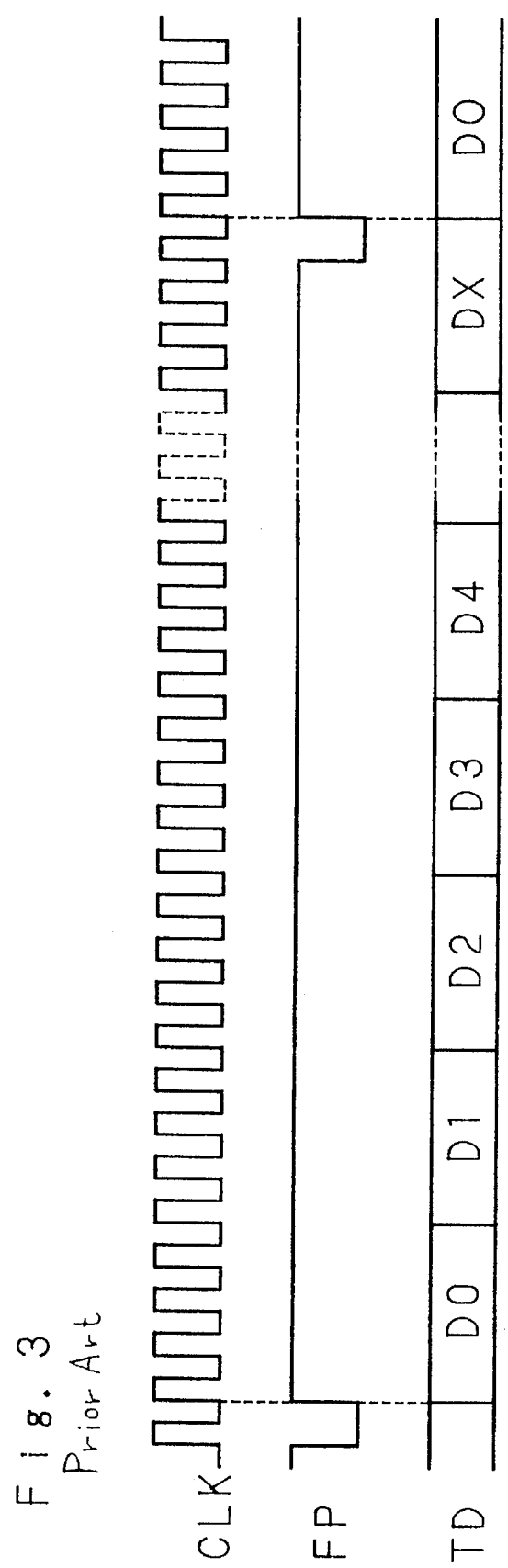
FIG. 3 is a timing chart of a conventional transmitting method.
Figure 4:
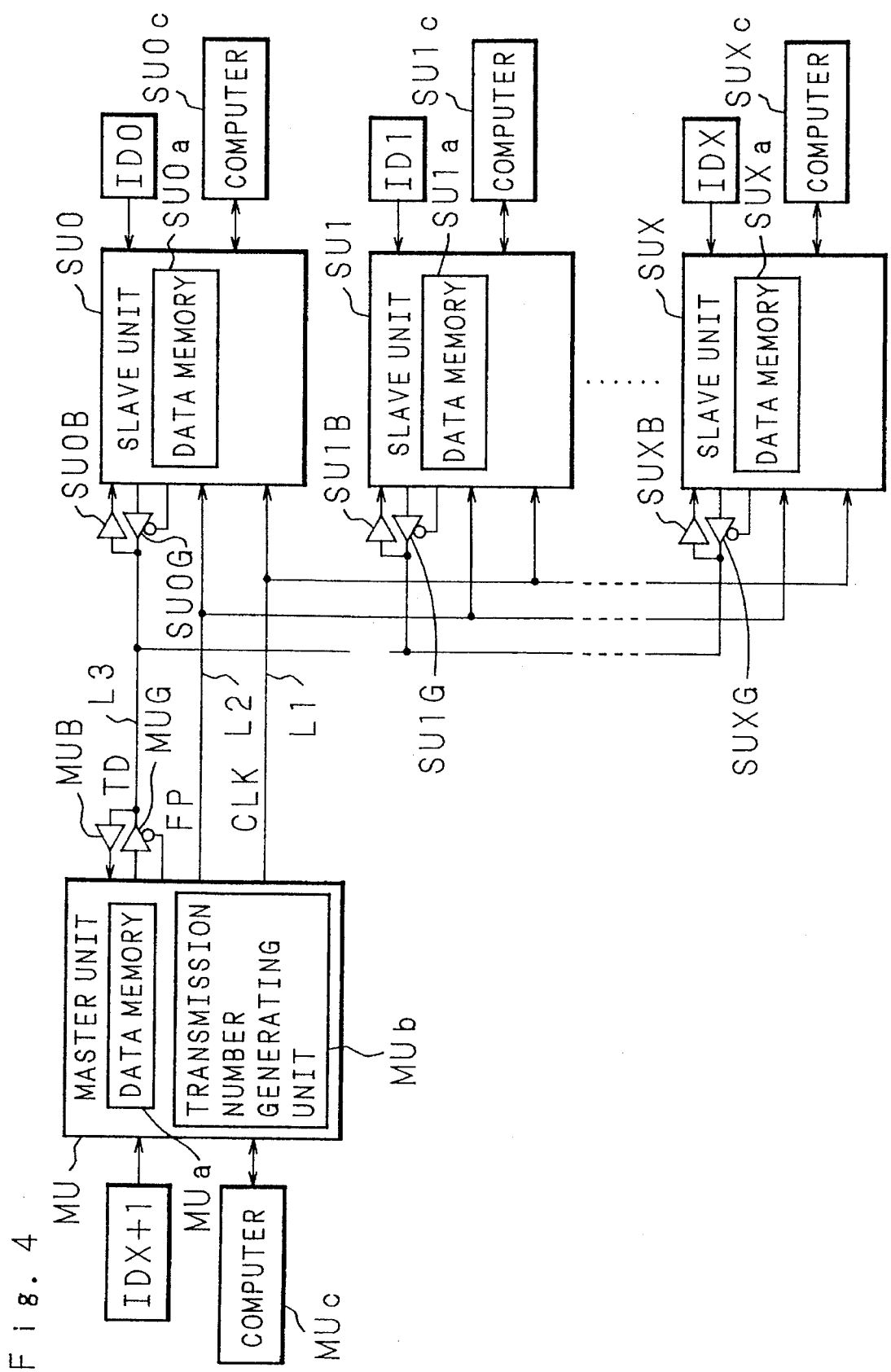
FIG. 4 is a block diagram of a configuration for explaining a data transferring method of the present invention.

FIG. 4 is a block diagram of a configuration for explaining a data transferring method of the present invention.

A master unit MU is provided with a data memory MUa which stores data to be transmitted/received and a transmission number generating circuit MUb which generates a signal indicative of a number (hereinafter, to be called transmission number) designating a unit which is to be a transmitting source.

In addition, the data memory MUa is composed, for example, of a dual port RAM and so on, and the transmission number generating unit MUb is composed, for example, of a ROM or a register and 32 frequency dividing counter.

The master unit MU and the respective slave units SU0, SU1 . . . and SUX are connected with each other by the signal lines L1, L2 and L3. From the master unit MU to the respective slave units SU0, SU1 . . . and SUX, clock CLK is given through the signal line L1, and frame pulse FP is given through the signal line L2. And between the master unit MU and the respective slave units SU0, SU1 . . . and SUX, transfer data TD is transmitted/received through the signal line L3.

From the signal line L3 to the master unit MU, data signal is inputted through a buffer HUB, and from the master unit MU to the signal line L3, data signal is outputted through a gate MUG controlled by control signal DIRM of low active.

On the other hand, from the signal line L3 to time respective slave units SU0, SU1 . . . and SUX, data signal is inputted through the buffers SU0B, SU1B . . . and SUXB, respectively, and from the respective slave units SU0, SU1

... and SUX to the signal line L3, data signal is outputted through the gates SU0G, SU1G ... and SUXG controlled respectively by a control signal DIRS of low active.

The slave units SU0, SU1 ... and SUX have respective data memories SU0a, SU1a ... and SUXa each composed, for example, of a dual port RAM.

In the slave units SU0, SU1 ... and SUX and the master unit MU, data ID0, ID1 ... and IDX and IDX+1 of the transmission numbers, that is, the numbers 0, 1 ... and X and X+1 which respectively specify the slave units and the master unit are set by using, for example, a digital switch and the like.

Further, to the master unit MU and the slave units SU0, SU1 ... and SUX, computers MUc, SU0c, SU1c ... and SUXc are connected respectively.

Figure 5:
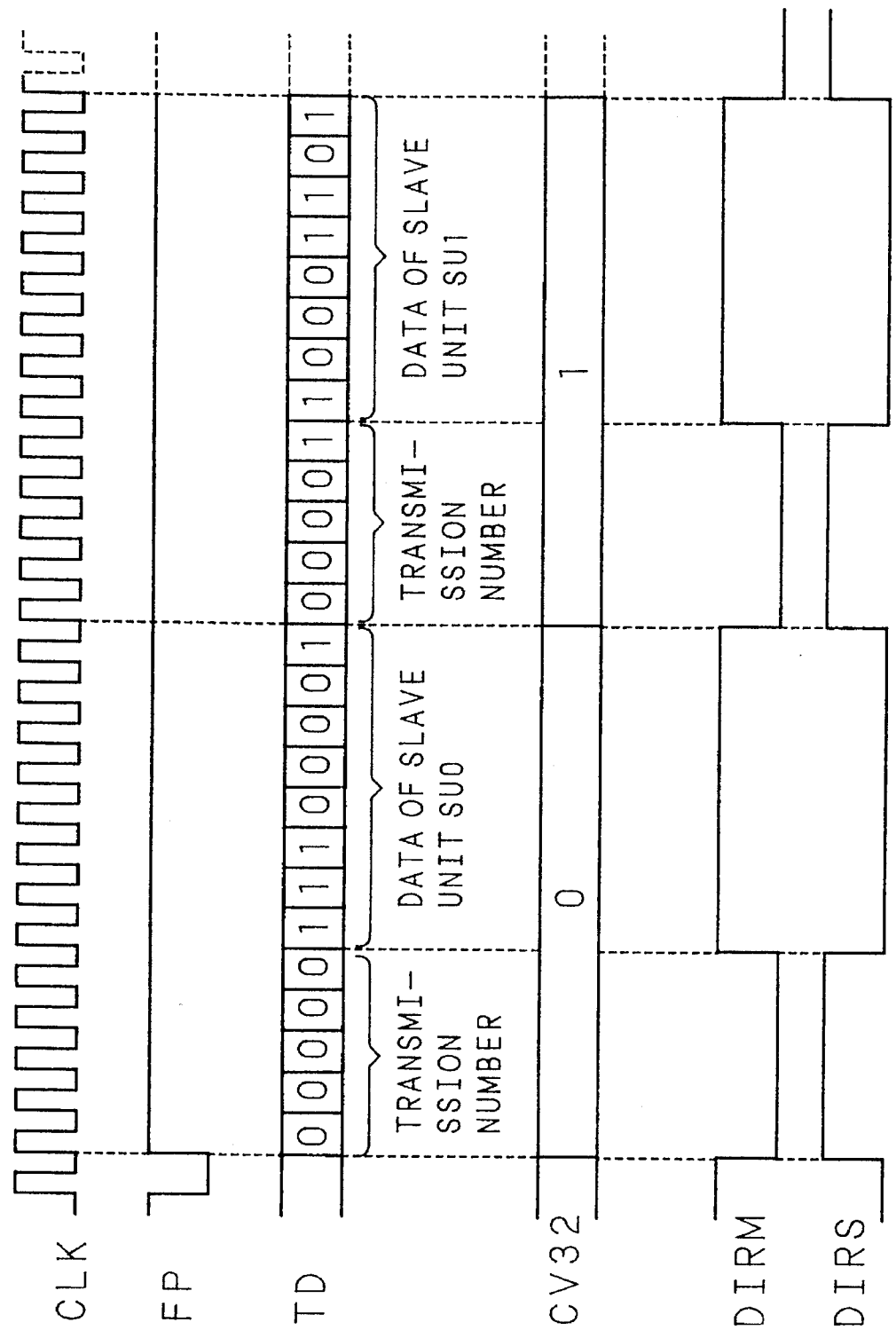
FIG. 5 is a timing chart of a data transferring method of the present invention.

FIG. 5 is a timing chart of a data transferring method of the invention.

According to this example, the respective data memories MUa, SU0a, SU1a ... and SUXa are composed of RAM of 8×32 bits, and the transmission number generating unit MUb of the master unit MU is composed of ROM of 5×32 bits and 32 frequency dividing counter, and can store 32 transmission numbers.

In addition, it is assumed that the transmission number given to the master unit MU is X+1=31, that is, IDX+1=31.

In addition, in the ROM of the transmission number generating unit MUb, transmission numbers designating data ID0, ID1 ... and IDX and IDX+1, shown in FIG. 6, with count values CV32 of the 32 frequency dividing counter as addresses, that is, designating the slave units SU0, SU1 ... and SUX are stored in advance.

As shown in the timing chart in FIG. 5, as the count values CV32 of the 32 frequency dividing counter are incremented and repeated in such a manner as 0, 1, 2 ... 30, 31, 0, 1 ..., the transmission number generating unit MUb of the master unit MU outputs successively "00000", "00001" ... "11111" which are contents of the ROM of the transmission number generating unit MUb shown in FIG. 6 as transmission numbers with the count values CV32 of the 32 frequency dividing counter as addressed.

In addition, during the master unit MU outputs the transmission numbers, the control signal DIRM becomes low level, and the fact makes signal of the transmission number to be outputted to the signal line L3 to be effective.

The respective units including the master unit MU, SU0, SU1 ... and SUX input signals of the transmission numbers which have been transmitted through the signal line L3, and when they are coincided with the numbers ID0, ID1, ID31 themselves respectively, they output the contents of the data memories MU, SU0a, SU1a ... and SUXa thereof to the signal line L3.

In the example shown in FIG. 5, when the transmission number "00000" that is, ID0 is outputted from the master unit MU, "11100001", the content of 8 bits of the data memory SU0a of the slave unit SU0 is outputted to the signal line L3, and next, when the transmission number "00001", that is, ID1 is outputted from the master unit Mu, "10001101" the content of the data memory SU1a of the slave unit SU1 is outputted to the signal line L3.

In addition, while the slave unit SU0, SU1 ... and SUX output data, the control signal DIRS becomes low level and the fact makes signal of data to be outputted to the signal line L3 to be effective.

On the other hand, the master unit MU or the slave units SU0, SU1 ... and SUX which do not correspond to the transmission number having been outputted from the master unit MU, take in data "11100001", "10001101" having been outputted to the signal line L3 and store them in the data memory MU or SU0a, SU1a ... SUXa.

When the transmission number "11111" of the case where the count value CV32 of the 32 frequency dividing counter is 31, that is, ID31 is outputted from the master unit MU, the master unit MU is designated, therefore the content of the data memory MUa of the master unit MU is transmitted to the signal line L3 and stored in the data memories SU0a, SU1a ... and SUXa of the slave units SU0, SU1, ... and SUX. Accordingly, when the data memories MUa, SU0a, SU1a ... and SUXa of the master unit MU and the respective slave units SU0, SU1 ... and SUX are accessed by the respective computers MUc, SU0c, SU1c ... and SUXc at a proper timing, transfer data from an optional unit can be referred to by the respective units.

In addition, in the aforementioned embodiment, as shown in FIG. 6, the generation order of the transmission numbers is fixed in ascending order, however, it is also possible to set it to be in an optional order, and further, it is also possible to make data output from an important slave unit to be used more frequently than data output from the other slave units.

As shown in FIG. 7, for example, when data is stored in ascending order in addresses from 0 to 15 of the ROM in the transmission number generating unit MUb, data "00000" is stored in the address 16, and data "10000" to "11110" are stored in ascending order in the following addresses 17 to 31, it is possible to make data output from the slave unit SU0 to be two times more frequently than that of other slave units SU1 ... SUX instead of no data output from the master unit MU.

In addition, in the aforementioned embodiment, the transmission numbers are stored in the ROM of the transmission number generating unit MUb in advance. However, it is also proper that RAM be used instead of ROM and the necessary numbers be written into the RAM in .the transmission number generating unit MUb at any time by the computer MUc.

And in the aforementioned embodiment, the configuration is such that the clock CLK and the frame pulse FP are generated in the master unit MU to be given to the respective slave units SU0, SU1 ... and SUX. However, it is a matter of course that the configuration is such that the clock CLK and the frame pulse FP are given to the master unit MU and the slave units SU0, SU1 ... and SUX from the outside.

Next, explanation will be given on the data transferring apparatus of the present invention.

Figure 8:
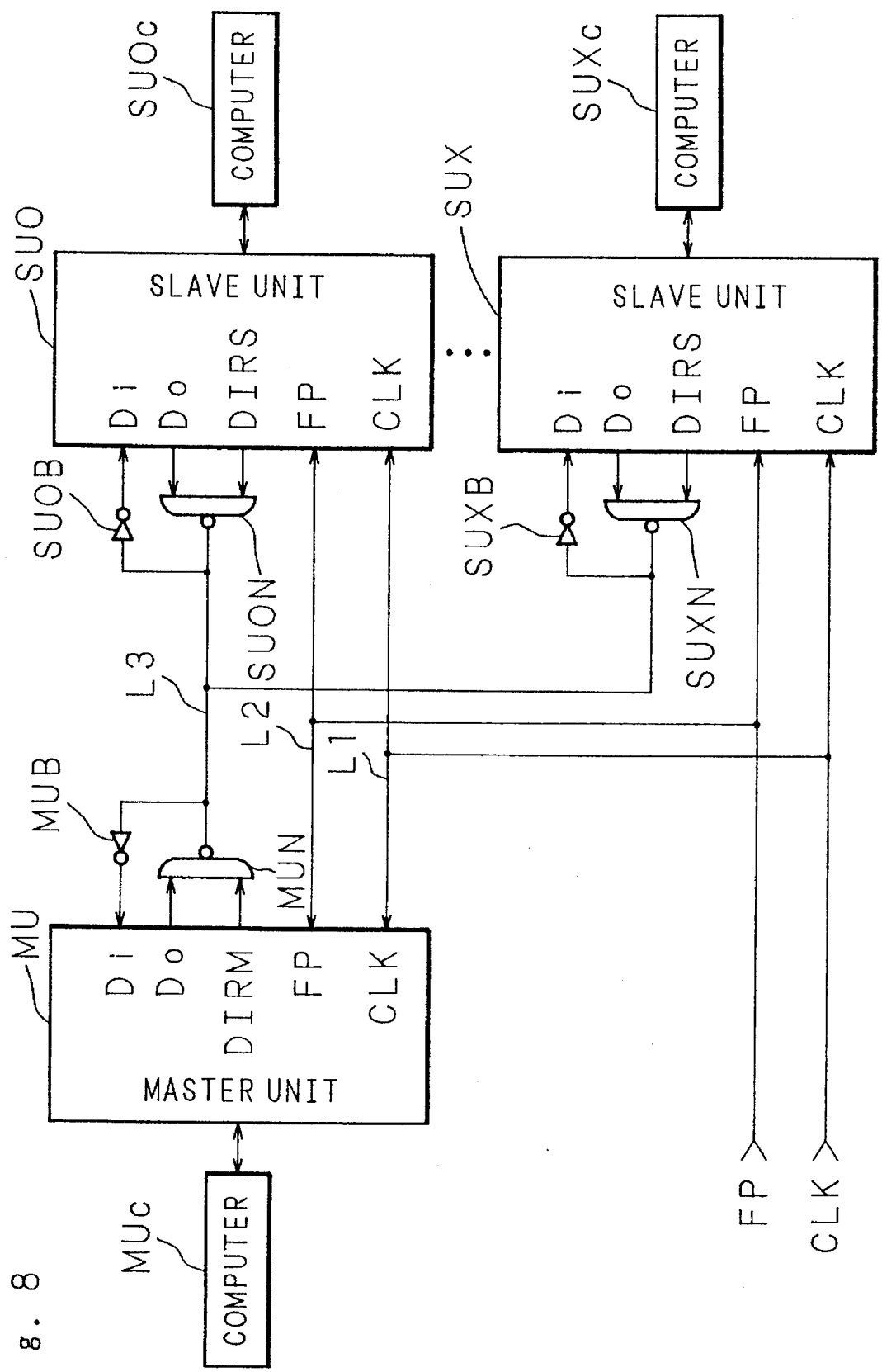
FIG. 8 is a block diagram showing one embodiment of a data transferring apparatus of the invention.

FIG. 8 is a block diagram showing a configuration of one embodiment of the data transferring apparatus of the present invention.

In. FIG. 8, it is as same as in the aforementioned first invention that reference symbol MU designates a master unit, SU0 to SUX designates slave units, MUc designates a computer connected to the master unit MU, and SU0 to SUXc designate computers connected to the respective slave units SU0, SU1 ... and SUX.

In addition, in FIG. 8, the clock CLK and the frame pulse FP are given to the master unit MU and the respective slave units SU0, SU1 ... and SUX respectively through the signal lines L1 and L2 from the outside. However, it is also a matter of course that the configuration is such that the abovementioned signals are generated in the master unit MU and given to the respective slave units SU0, SU1 ... and SUX.

From the respective units SU0, SU1 ... and SUX, data output signal Do and control signals DIRM, DIRS are outputted to the signal line L3 through NAND gate MUN, SU0N, SU1N ... and SUXN, and the respective units MU, SU0, SU1 ... and SUX, data input signal Di is inputted from the signal line L3 through buffers MUB, SU0B, SU1B ... and SUXB of high impedance.

Figure 9:
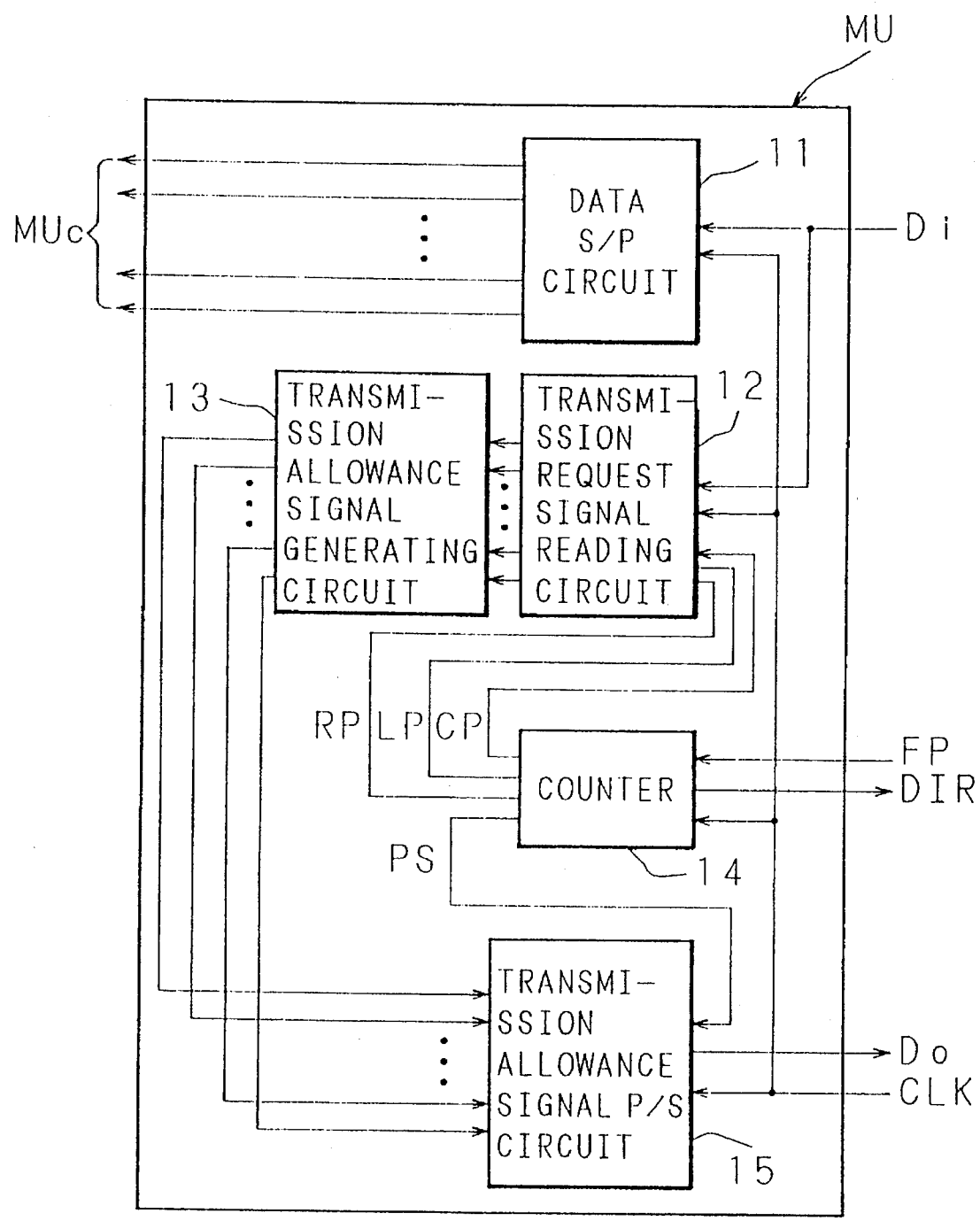
FIG. 9 is a block diagram showing a master unit of a data transferring apparatus of the present invention.

FIG. 9 is a block diagram showing a configuration of the master unit MU.

The master unit MU is provided with a data serial/parallel converting circuit (data S/P circuit) 11, a transmission request signal reading circuit 12, a transmission allowance signal generating circuit 13, a counter 14, a transmission allowance signal parallel/serial converting circuit (transmission allowance signal P/S circuit) 15 and so on.

To the data S/P circuit 11, the data input signal Di and the clock CLK are given. The data S/P circuit 11 inputs each bit of the data input signal Di which is serial signal in synchronism with the clock CLK, and converts data included in the data input signal Di to output to the computer MUc.

To the transmission request signal reading circuit 12, besides the data input signal Di and the clock CLK are given from the outside of the master unit MU, clear pulse CP load pulse LP and request processing confirming pulse RP are given from the counter 14 to be described later. The transmission request signal reading circuit 12 inputs each bit of the data input signal Di in synchronism with the clock CLK, and outputs parallel signal obtained by reading transmission request signal included in the data input signal Di to perform processing to be described later to the transmission allowance signal generating circuit 13.

The detailed explanation will be made later on the transmission request signal reading circuit 12.

The transmission allowance signal generating circuit 13 generates transmission allowance signal according to a signal outputted from the aforementioned transmission request signal reading circuit 12, however, description will be made later.

To the counter 14, the frame pulse FP and the clock CLK are inputted. The counter 14 counts the clock CLK with frame pulse FP as a base, thereby besides generating the control signal DIRM, it generates the aforementioned clear pulse CP, load pulse LP and request processing confirming pulse RP to supply them to the transmission request signal reading circuit 12, and also generates a P/S converting signal PS to supply it to the transmission allowance signal P/S circuit 15 and so on.

To the transmission allowance signal P/S circuit 15, are applied, the clock CLK and the P/S converting signal PS from the counter 14 and a transmission allowance signal outputted from the aforesaid transmission allowance signal generating circuit 13 as parallel signals. The transmission allowance signal P/S circuit 15 converts transmission allowance signal given from the transmission allowance signal generating circuit 13 into a serial signal in accordance with the P/S converting signal PS from the counter 14, and outputs it to the signal line L3 as a part of the data output signal Do.

Figure 10:
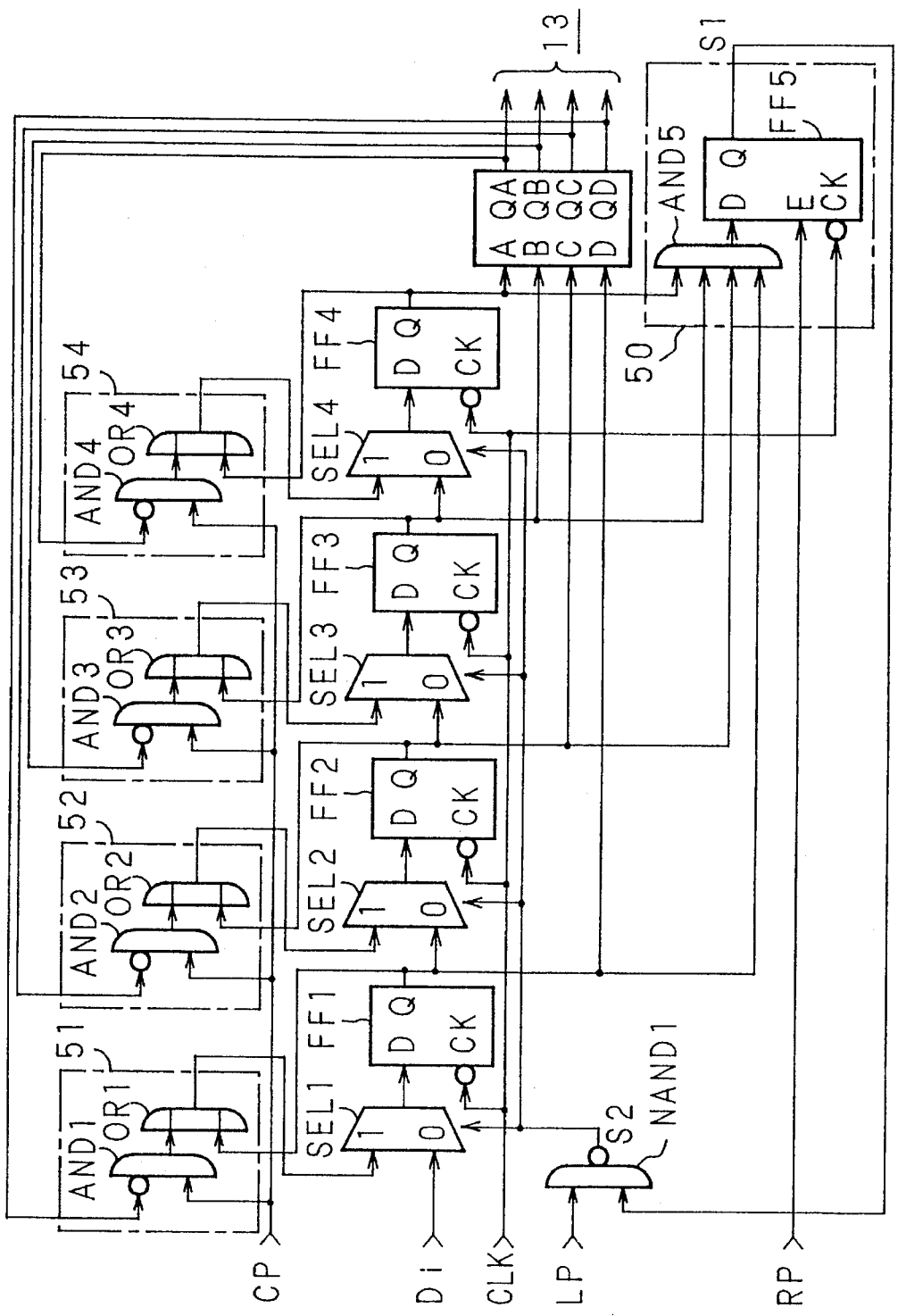
FIG. 10 is a circuit diagram showing a transmission request signal reading circuit of a data transferring apparatus of the present invention.

FIG. 10 is a circuit diagram showing a configuration of the transmission request signal reading circuit 12 shown in the aforementioned FIG. 9.

In addition, time circuit shown in FIG. 10 is a configuration example of the case where four slave units SU0, SU1, SU2 and SU3 are connected to the master unit MU, and a portion exclusive of the transmission allowance signal generating circuit shown by reference symbol 13 is the transmission request signal reading circuit 12.

The transmission request signal reading circuit 12, shown in FIG. 10, corresponding to the four slave units SU0, SU1, SU2 and SU3, is provided with the transmission request rewriting circuits 51 to 54, selectors SEL1 to SEL4 as the selecting circuits, flip flops FF1 to FF4 as the storing circuits, and is further provided with NAND gate NAND1 as the controlling circuit and a detecting circuit 50.

In addition, the transmission request rewriting circuits 51 to 54 each have the same configuration, and each circuit is composed of an AND gates (AND 1 AND2, AND3, AND4) having two inputs, one input being negative logic and the other input being positive logic, and an OR gates (OR1 OR2, OR3, OR4) having two inputs, making the output of each of the AND gates, AND1 to AND4, one input.

The detecting circuit 50 is composed of the AND gate AND5 and the flip flop FF5.

The transmission allowance signal generating circuit 13, also corresponding to the four slave units SU0, SU1, SU2 and SU3, is provided with a storing unit such as a register, ROM, RAM or the like having four input terminals A, B, C and D, and four output terminals QA, QB, QC and QD.

The transmission request signal reading circuit 12 shown in FIG. 10, corresponding, as aforementioned, to the four slave units SU0, SU1, SU2 and SU3, has a four stage configuration. That is, each stage is composed of an AND gate (AND1 AND2, AND3, AND4), OR gate (OR1 OR2, OR3, OR4), selectors (SEL1 SEL2, SEL3, SEL4) and flip flop (FF1 FF2, FF3, FF4).

At each stage, at an input terminal of positive logic of the AND, gate (AND 1 AND2, AND3, AND4), a clear pulse CP is inputted, and the output thereof is inputted to one input terminal of the OR gate (OR1, OR2, OR3, OR4). To the other input terminal of the OR gate (OR1, OR2, OR3, OR4), the Q output of the flip flop (FF1, FF2, FF3, FF4) is inputted, and the output thereof is inputted to the "1" side input terminal of the selector (SEL1 SEL2, SEL3, SEL4). And to a D input terminal of the flip flop (FF1, FF2, FF3, FF4), the output of the selector (SEL1, SEL2, SEL3, SEL4) is inputted, and to the CK input terminal of negative logic thereof, clock CLK is inputted.

The abovedescribed configuration is common for each stage.

To input terminals of negative logic of the AND gates AND1, AND2, AND3 and AND4 at the respective stages, the output terminals QA, QB, QC and QD of the aforementioned transmission allowance signal generating circuit 13 are connected respectively.

The data input signal Di is inputted to the "0" side input terminal of the selector SEL1, the Q output of the flip flop FF1 to that of the selector SEL2, the Q output of the flip flop FF2 to that of the selector SEL3, and the Q output of the flip flop FF3 to that of the selector SEL4.

In addition, the selectors SEL1 to SEL4 select and output the input from the "1" side input terminal when signal S2, to be described later, is "1" and the input from the "0" side input terminal when it is "0".

The Q outputs of the flip flops FF1 to FF4 are respectively inputted to the input terminal D, C, B and A of the transmission allowance signal generating circuit 13, after the aforementioned, and further are inputted to an AND gate AND5 having four inputs. The output of the AND gate AND5 is inputted to the D input terminal of the flip flop FF5.

To the CK input terminal of negative logic of the flip flop FF5, the clock CLK is inputted, and to the E input terminal, the request processing confirming pulse RP is inputted, respectively. And the Q output of the flip flop FF5 is inputted as a signal S1 to one input terminal of the NAND gate NAND1.

In addition, an E (Enable) input terminal of the flip flop FF5 makes the flip flop FF5 to be in operable state only when high level signal is inputted, and makes it to be in non operable state (freeze state) with holding the state of signal output at that time when low level signal is inputted.

To the another input terminal of the NAND gate NAND1, load pulse LP is inputted. The output of the NAND gate NAND1 is the signal S2, and as aforementioned, it is applied to the respective selectors SEL1 to SEL4 to control the respective selecting operation.

In addition, the outputs from the respective output terminals QA, QB, QC and QD of the transmission allowance signal generating circuit 13 are inputted respectively to the input terminals of negative logic of AND gate AND4, AND3, AND2 and AND1, they are also outputted to the transmission allowance signal P/S circuit 15 as parallel signals of four bits.

The transmission allowance signal P/S circuit 15 converts the parallel signals of four bits outputted from the transmission allowance signal generating circuit 13 into serial signal when the P/S converting signal PS is given from the counter 14 to output it to the signal line L3 as the data output signal Do.

When the operation of the transmission request signal reading circuit 12 shown in FIG. 10 is summarized, it is as follows.

Only when both the load pulse LP and the signal S1 are high level ("1"), the respective selectors SEL1 to SEL4 selects such "0" side inputs. In the state, each bit of the data input signal Di is latched as it is shifted successively in the respective flip flops FF1 to FF4 in synchronism with the clock CLK.

In the state where the respective selectors SEL 1 to SEL 4 select the "1" side input, to the D input terminal of the respective flip flops FF1 to FF4, the outputs of the OR gates OR1 to OF4 are inputted respectively. In this case, when clear pulse CP is high level, it is only when the Q outputs of the respective flip flops FF1 to FF4 themselves are "0" and the outputs of the output terminal QD, QC, QB and QA to which the transmission allowance signal generating circuit 13 corresponds is "1", that "0" is inputted to the D input terminal of the respective flip flop FF1 to FF4.

And in the state where the outputs of the respective flip flops FF1 to FF are all "1", the output of the AND gate AND5 becomes "1", the flip flops FF 5 outputs a signal and the signal S1 becomes "1" when the request processing confirming pulse RP is high level at that time.

The relationship between the values of input signals to the respective input terminals A, B, C and D of the transmission allowance signal generating circuit 13 and the values of the output, signals from the respective output terminals QA, QB, QC and QD are set in advance as shown in FIG. 11. But this is only an example and it is a matter of course to exchange them optionally.

In addition, in FIG. 11, the mark "X" means "don't care", that is, it shows all right either to take "0" or "1".

Figure 12:
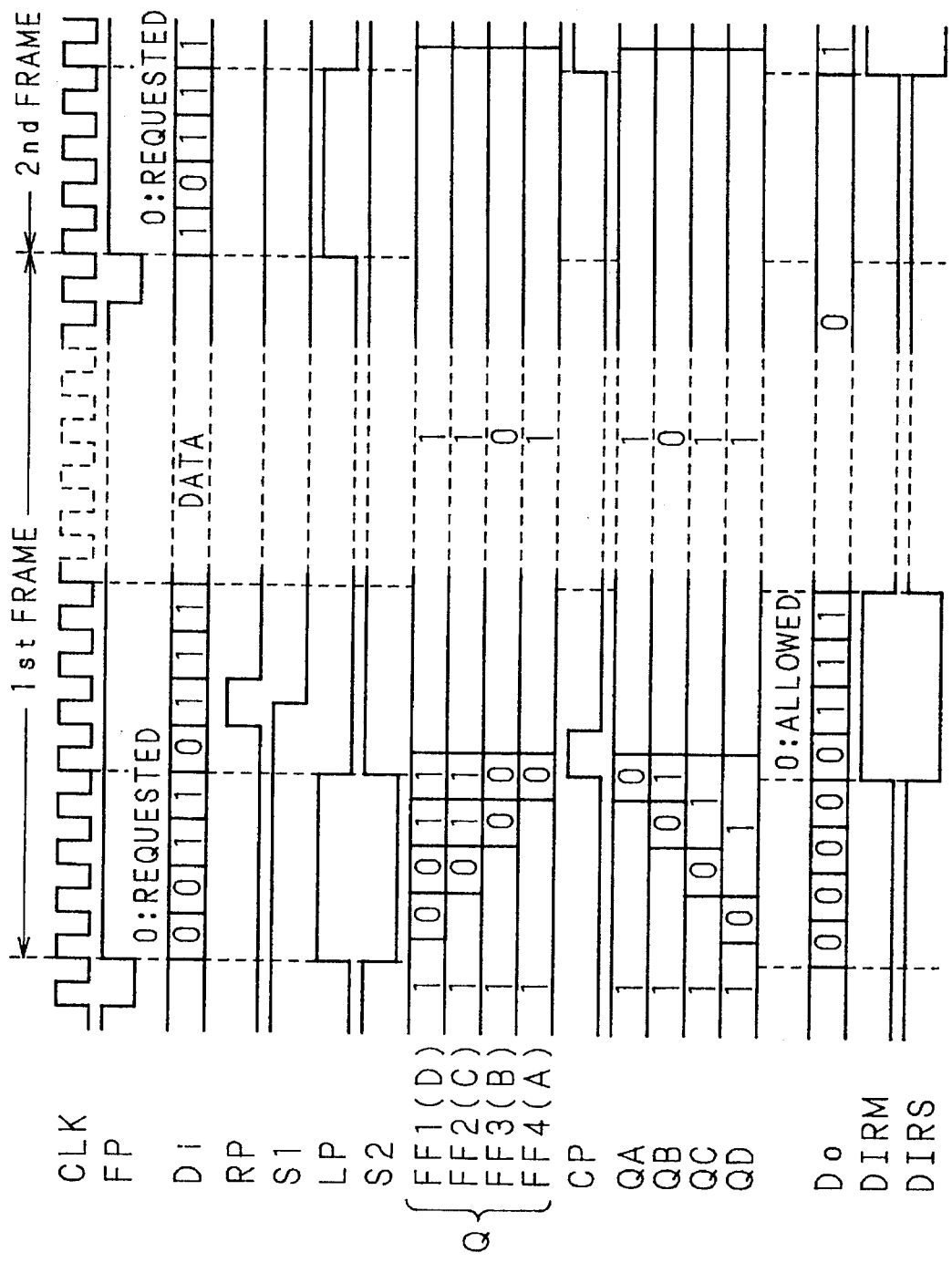
FIG. 12 is a timing chart showing operations of the transmission request signal reading circuit of a data transferring apparatus of the present invention.
Figure 13:
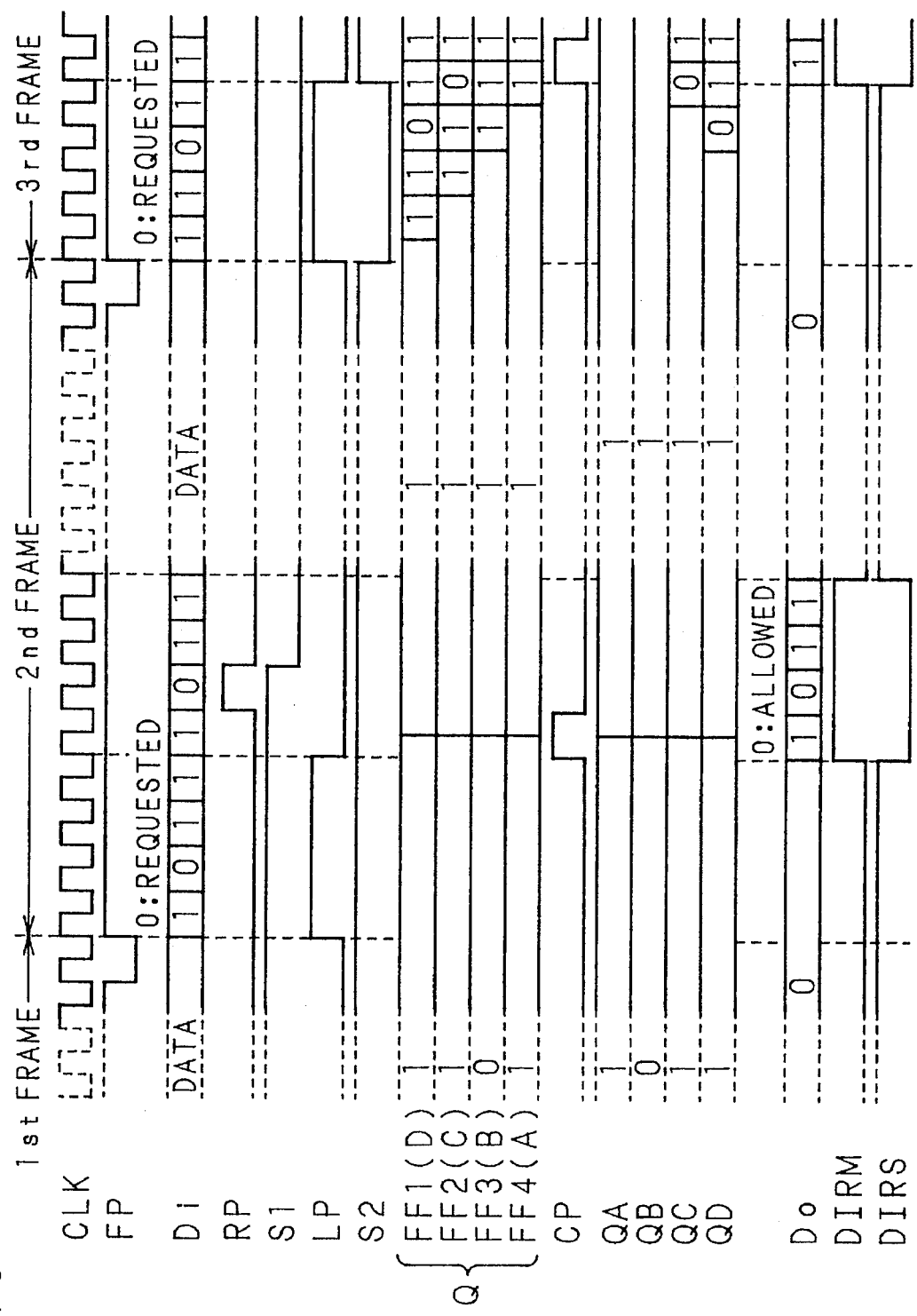
FIG. 13 is a tinting chart showing operations of the transmission request signal reading circuit of a data transferring apparatus of the present invention.

FIG. 12 and FIG. 13 are timing charts showing the operation of the transmission request signal reading circuit 12 shown in FIG. 10.

As shown in FIG. 12 and FIG. 13, the frame pulse FP falls in synchronism with rising of the clock CLK, and rises in synchronism with the next rising of the clock CLK, and after that holds high level for a predetermined cycle of the clock CLK. The period from rising to the next rising of the frame pulse FP is called one frame. In this embodiment, however, the clock CLK and the frame pulse FP are generated by an external circuit not shown and supplied to the master unit MU and the slave units SU0, SU1, SU2 and SU3, it is also proper, as aforementioned, to generate them in the master unit MU to supply them to the respective slave units SU0, SU1, SU2 and SU3.

The load pulse LP, the request processing confirming pulse RP, the clear pulse CP and the control signal DIRM are generated in the counter 14.

The load pulse LP rises in synchronism with rising of the frame pulse FP, and holds high level for four clock cycles after that, and falls in synchronism with rising of the clock CLK.

The clear pulse CP rises in synchronism with falling of the load pulse LP, and holds high level for one clock cycle after that, and falls in synchronism with rising of the clock CLK.

The request processing confirming pulse RP rises in synchronism with falling of the clear pulse CP, and holds high level for one clock cycle after that, and falls in synchronism with rising of the clock CLK.

Accordingly, four clock cycles from rising of the frame pulse FP correspond to the high level period of the load pulse LP, the next one clock cycle is the high level period of the clear pulse CP, and the further next one clock cycle is the high level period of the request processing confirming pulse RP.

The control signal DIRM rises in synchronism with falling of the load pulse LP and hold high level for four cycles of the clock CLK after that, and falls in synchronism with rising of the clock CLK.

Although not shown in the timing charts of FIG. 12 and FIG. 13, the control signal DIRS for outputting the data output signals Do from the respective slave units SU0, SU1, SU2 and SU3, is, as shown in FIG. 12 and FIG. 13, in complementary relationship with the control signal DIRM for outputting the data output signal Do from the master unit MU.

The P/S converting signal PS given from the counter 14 to the transmission allowance signal P/S circuit 15, as described later, latches the transmission allowance signal given as parallel signal from the transmission allowance signal generating circuit 13 to the transmission allowance signal P/S circuit 15 at the time of falling of the load pulse LP to convert it to serial signal.

By the way, each of the slave units SU0, SU1, SU2 and SU3 outputs the transmission request signal of 1 bit which shows the existence of a transmission request by "0" and the non existence thereof by "1". As the transmission request signals outputted by the respective slave units SU0, SU1, SU2 and SU3 successively to the signal line L3 for the respective one clock cycle from the time point of rising of the frame pulse FP, they are inputted as the data input signal Di in a state of serial signals of four bits.

In the following explanation, it is assumed that, in an initial state, as shown in the data input signal Di shown in FIG. 12 and FIG. 13, the transmission request signals from the respective slave units SU0, SU1, SU2 and SU3 are "0", "0", "1", "1", that is, there are the transmission requests from the slave units SU0 and SU1, and there are not transmission requests from the slave units SU3 and SU4.

In the master unit MU, one frame, to be concrete, a period from rising of the frame pulse FP to the next rising is one operational cycle, and in the first four clock cycle of each operational cycle, the transmission request signals are read from the respective slave units SU0, SU1, SU2 and SU3, in the next four clock cycles, the output of the transmission allowance signal, and in the remaining cycle, the data outputted to the signal line L3 corresponding to the transmission allowance signal is read.

At first, at rising time of the first frame pulse FP of the first frame shown in FIG. 12, it is assumed that the outputs of the respective flip flops FF1 to FF4 are "1", and accordingly, as shown in FIG. 12, the output signals from the respective output terminals QA, QB, QC and QD are all "1".

In a period of four clock cycles from rising of the frame pulse FP, the transmission request signals outputted from the respective slave units SU0, SU1, SU2 and SU3 are read.

In this period, since the output signals S1 of the flip flip FF5 is high level and the load pulse LP is also high level, the output signal S2 of the NAND gate NAND1 falls at the same time with rising of the frame pulse FP and holds low level. Accordingly, the respective selectors SEL 1 to SEL4 select inputs to the "0" side and output them.

In one clock cycle immediately after rising of the load pulse LP, the first bit "0" of the data input signal Di is selected by the selector SEL1 and latched by the flip flop FF1. As the result, the Q output of the flip flop FF1 becomes "0".

In the second one block cycle, the Q output "0" of the flip flop FF1 is selected by the selector SEL2 and latched by the flip flop FF2, as well as the second bit "0" of the data input signal Di is selected by the selector SEL1 and latched by the flip flop FF1. As the result, the Q outputs of the flip flop FF2 becomes "0", and the flip flop FF1 becomes "0" respectively.

In the third one clock cycle, the Q output "0" of the flip flop FF2 is selected by the selector SEL3 and latched by the flip flop FF3, the Q output "0" of the flip flop FF1 is selected by the selector SEL2 and latched by the flip flop FF2, and the third bit "1" of the data input signal Di is selected by the selector SEL1 and latched by the flip flop FF1. As the result, the Q output of the flip flop FF3 becomes "0", the Q output of the flip flop FF2 becomes "0", and the Q output of the flip flop FF1 becomes "1" respectively.

In the fourth one clock cycle, the Q output "0" of the flip flop FF3 is selected by the selector SEL4 and latched by the flip flop FF4, the Q output "0" of the flip flop FF2 is selected by the selector SEL3 and latched by the flip flop FF3, the Q output "1" of the flip flop FF1 is selected by the selector SEL2 and latched by the flip flop FF2, and the fourth bit "1" of the data input signal Di is selected by the selector SEl1 and is latched by the flip flop FF1. As the result, both the Q outputs of the flip flops FF4 and FF3 are "0", and both the Q outputs of the flip flops FF2 and FF1 are "1".

At this time, since the input signals to the respective input terminals A, B, C and D of the transmission allowance signal generating circuit 13 become "0011", the output signals from the respective output terminals QA, QB, QC and QD of the transmission allowance signal generating circuit 13, as shown in FIG. 11, become "0111". Accordingly, at this time, by the fact that the P/S converting signal PS is given from the counter 14 to the transmission allowance signal P/S circuit 15, transmission allowance signal is outputted as the data output signal Do from the transmission allowance signal P/S circuit 15 to the signal line L3 over the following four clock cycles in a state of four bit serial signal "0111".

In addition, the transmission allowance signal shows that transmission is allowed when it is "0", and that transmission is not allowed when it is "1".

The control signal DIRM outputted from the counter 14 becomes high level over four clock cycles after falling of the load pulse LP. Thereby, the transmission allowance signal "0111" outputted from the master unit MU to the signal line L3 as the data output signal Do becomes active, and at the same time, it is inputted to the master unit MU and the respective slave units SU0, SU1, SU2 and SU3 as the data input signal Di.

When the transmission allowance signal "0111" is outputted from the master unit MU to the signal line L3 as the data output signal Do, the slave unit SU0 makes the control signal DIRS to be high level to output data to the signal line L3 as the data output signal Do until the next load pulse LP rises from the time point when the control signal DIRM is changed to low level. The data outputted from the slave unit SU0 is inputted to the master unit MU and the respective slave units SU0, SU1, SU2 and SU3 as the data input signal Di.

By the way, in the master unit MU, the clear pulse CP rises in synchronism with falling of the load pulse LP and holds high level over one clock cycle.

By the fact that the load pulse LP is changed to low level, the output signal S2 of the NAND gate NAND1 becomes high level, therefore, the respective selectors SEL1 to SEL4 become such a state where they select the "1" side inputs and output them to the respective flip flops FF1 to FF4. Accordingly, the respective flip flops FF1 to FF4 becomes a state where they latch the output signals of the respective OR gate OR1 to OR4 in synchronism with the clock CLK.

To be concrete, the outputs of the respective flip flops FF1 to FF4 are as follows.

Since the Q outputs of the flip flop FF4 is "0" and the QA output of the transmission allowance signal generating circuit 13 is "0", "1" is inputted to the input terminal of positive logic of the AND gate AND4 and "0" is inputted to the input terminal of negative logic, respectively, and the output thereof becomes "1". Since the two inputs of the gate OR4 are "1" and "0", the output thereof is "1". Accordingly, the output signal "1" of the OR gate OR4 is selected by the selector SEL4 and is latched by the flip flop FF4, the output of the flip flop FF4 becomes "1" from "0".

Since the Q output of the flip flop FF3 is "0" and the QB output of the transmission allowance signal generating circuit 13 is "1", "1" is inputted to the input terminal of positive logic and "1" is inputted to the input terminal of negative logic of the AND gate AND3, and the output thereof is "0". Since both the two inputs of the OR gate OR3 are "0", the output thereof becomes "0". Accordingly, the output signal "0" of the OR gate OR3 is selected by the selector SEL3 and is latched by the flip flop FF3, the output of the flip flop FF3 holds "0".

Since the Q output of the flip flop FF2 is "1" and the QC output of the transmission allowance signal generating circuit 13 is "1", "1" is inputted to the input terminal of positive logic and "1" is inputted to the input terminal of negative logic of the AND gate AND2, the output thereof become "0". Since both the two inputs of the OR gate OR2 are "1" and "0", the output thereof becomes "1". Accordingly, the output signal "1" of the OR gate OR2 is selected by the selector SEL2 and is latched to the flip flop 2, the Q output of the flip flop FF2 holds "1".

Since the Q output of the flip flop FF1 is "1" and the QD output of the transmission allowance signal generating circuit 13 is "1", "1" is inputted to the input terminal of positive logic and "1" is inputted to the input terminal of negative logic of the AND gate AND1, the output thereof becomes "0". Since both the two inputs of the OR gate OR1 are "1" and "0", the output thereof becomes "1". Accordingly, since the output signal "1" of the OR gate OR1 is selected by the selector SEL1 and is latched by the flip flop FF1, the Q output of the flip flop FF1 holds "1".

According to those abovementioned, as the input signals of the respective input terminals A, B, C and D of the transmission allowance signal generating circuit 13 become "1", "0", "1" and "1" immediately after rising of the clear pulse CP, the output signals from the output terminals QA, QB, QC and QD, as shown in FIG. 11, become "1", "0", "1" and "1". But at this time point, the P/S converting signal PS is not outputted from the counter 14 to the transmission allowance signal P/S circuit 15, the output signal "1011" from the transmission allowance signal generating circuit 13 is not outputted from the master unit MU to the signal Line L3.

In the next one clock cycle, the request processing confirming pulse RP becomes high level and the flip flop FF5 is in the operable state. Because not all of the Q outputs of the flip flops FF1 to FF4 are "1", the output of the AND gate AND5 becomes "0", and the Q output of the flip flop FF5, that is, the signal S1 also becomes "0". And when the request signal processing confirming pulse RP falls, this state is kept until the request processing confirming pulse RP becomes high level next.

Until the frame pulse FP rises next, data is outputted From the slave unit SU0 to the signal line L3 as the data output signal Do, and the master unit MU and the respective slave units SU0, SU1, SU2 and SU3 input it as the data input signal Di. In the case where there is no newly generated transmission request from the slave units SU0, SU2 and SU3 at this time, the state is that there is a transmission request only from the slave unit SU1. Accordingly, the transmission request signal outputted from the respective slave units SU0, SU1, SU2 and SU3 in a period of four clock cycles from rising time of the next frame pulse FP, are "1", "0", "1" and "1".

In the second frame shown in FIG. 13, the transmission request signal outputted from the respective slave units SU0, SU1, SU2 and SU3 are inputted from the signal line L3 to the master unit MU as the data input signal Di. But the output signal S1 of the flip flop FF5 keeps low level, therefore the output signal S2 of the NAND gate NAND1 hods high level, and the respective selectors SEL1 to SEL4 are kept in a state where they select the "1" side inputs and output them. Accordingly, when in the second frame, the transmission request signal outputted from the respective slave units SU0, SU1, SU2 and SU3 are not taken into the transmission request signal reading circuit 12.

In the transmission allowance signal P/S circuit 15, by the fact that the P/S converting signal PS is given from the counter 14, the output of the transmission allowance signal generating circuit 13 at falling time of the load pulse LP, that is, "1", "0", "1" and "1" are converted into serial signal and outputted to the signal line L3 as the data output signal Do over the following four clock cycles.

At the same time, in the transmission request signal reading circuit 12, since the clear pulse CP rises, the output of the AND gate AND3 among the AND gates AND1 to AND4 to whose input terminals of negative logic, "0" is inputted, becomes "1". Accordingly, the output of the OR gate OR3 becomes "1", which is selected by the selector SEL3 and is latched by the flip flop FF3. In the other flip flops FF1, FF2 and FF4, the respective outputs "1" are outputted from the OR gate OR1, OR2 and OR4 respectively and selected by the selectors SEL1, SEL2 and SEL4 respectively. Accordingly, all of the respective flip flop FF1, FF2 and FF4 latch "1", therefore the respective Q outputs also become "1".

In addition, the fact that data is outputted from the slave unit SU1 to the signal line L3 is similar to the case of the aforementioned first frame.

According to the aforementioned, since all of the Q outputs of the respective flip flops FF1 to FF4, that is, all of the inputs to the input terminals A, B, C and D of the transmission allowance signal generating circuit 13 become "1", the outputs of the output terminals QA, QB, QC and QD of the transmission allowance signal generating circuit 13 become all "1" as shown in FIG. 11.

In a period of the next one clock cycle, since the request processing confirming pulse RP becomes high level, the flip flop FF5 is in an operable state only in the period of one clock cycle. At this time, all of the Q outputs of the respective flip flops FF1 to FF4 are already "1", the output of the AND gate AND5 also becomes high level, and the output signal S1 of the flip flop FF5 becomes high level in synchronism with rising of the next clock CLK. At the same time, since the request processing confirming pulse RP falls to low level, the flip flop FF5 is in non operable state at least until the next rising time point of the request processing confirming pulse RP, and the output signal S2 thereof is kept high level.

Accordingly, in the third frame, when the frame pulse FP rises and at the same time the load pulse LP rises, since the output of the NAND gate NAND1 becomes "0", the respective selectors SEL1 to SEL4 are in a state of selecting the "0" side inputs, that is, the data input signal Di. In other words, in a state where all of the Q outputs of the flip flop FF1 to FF4 are "1", when the request processing confirming pulse RP is inputted, the transmission request signal reading circuit 12 is in a state where the data input signal Di is taken in.

As described in the above, according to the data transferring method of the first invention, not only the data transferring from the slave unit to the master unit, but also the data transferring between the slave units, and that from the master unit to the slave units becomes possible, thereby realizing the monitoring variety in this kind communication system.

According to the data transmission apparatus of the second invention, by allowing the transmission requests from the slave units by hardware according to a predetermined priority order in the master unit, it becomes possible to give the transmission allowance to a slave unit without response time of transfer data, thereby a quick data transferring can be realized between the respective units.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data transferring apparatus, comprising a master unit; and a plurality of slave units, for transferring data between the master unit (MU) and said plurality of slave units (SU0, SU1, SU2, SU3) according to a synchronizing signal (CLK) supplied to each unit, each of said master unit (MU) and plurality of slave units (SU0, SU1, SU2, SU3) being connected with each other, said master unit comprising:

a plurality of storing circuits (FF1, FF2, FF3, FF4) which respectively store transmission request signals representing transmission requests from respective slave units (SU0, SU1, SU2, SU3);

a transmission allowance signal generating circuit (13), connected to the plurality of storing circuits, for generating a transmission allowance signal representing the transmission allowance of only one slave unit (SU0, SU1, SU2, or SU3) according to output signals received from the plurality of storing circuits indicating stored contents of said plurality of storing circuits (FF1, FF2, FF3, FF4) and a predetermined priority order;

transmission request rewriting circuits (51, 52, 53, 54) each coupled to a respective storing circuit, for rewriting the stored contents of a respective storing circuit (FF1, FF2, FF3 or FF4) which stores the transmission request signal from the respective slave unit (SU0, SU1, SU2 or SU3), which has been allowed to transmit data based upon a signal from said transmission allowance signal generating circuit (13), into a state where there is no transmission request;

a detecting circuit (50), coupled to said storing circuits, for detecting a predetermined state where there is no transmission request obtained by rewriting all of the stored contents of said plurality of storing circuit (FF1, FF2, FF3, FF4);

selecting circuits (SEL1, SEL2, SEL3, SEL4) each being respectively connected to a respective one of the plurality of storing circuits and also to a respective one of the transmission request rewriting circuits, for selecting either a rewriting operation performed by a respective transmission request rewriting circuit (51, 52, 53, 54), or a signal input operation causing the transmission request signals from the respective slave units (SU0, SU1, SU2, SU3) to be stored in respective storing circuits (FF1, FF2, FF3, FF4); and a control circuit (NAND 1) having an output connected to each of said selecting circuits (SEL1, SEL2, SEL3, SEL4) and an input connected to receive an input signal from said detecting circuit for transmitting a signal to select either said signal input operation only when said predetermined state is detected by said detecting circuit or said rewriting operation when said predetermined state is not detected by said detecting circuit.

2. A data transferring apparatus as set forth in claim 1, wherein only one of said transmission request rewriting circuits (51, 52, 53 or 54), which corresponds to a slave unit 53 or 54), which corresponds to a slave unit having the most significant priority order among the plurality of slave units (SU0, SU1, SU2, SU3) having a transmission request, rewrites the stored contents of a storing circuit (FF1, FF2, FF3 or FF4) corresponding thereto.

3. A data transferring apparatus as set forth in claim 1, wherein said plurality of storing circuits (FF1, FF2, FF3, FF4) each include flip flops, which output predetermined signals when a transmission request from a slave respective unit (SU0, SU1, SU2, SU3) corresponding thereto is stored therein.

4. A data transferring apparatus, comprising a master unit; and a plurality of slave units, for transferring data between the master unit (MU) and said plurality of slave units (SU0, SU1, SU2, SU3) according to a synchronizing signal (CLK) supplied to each unit, each of said master unit (MU) and plurality of slave units (SU0, SU1, SU2, SU3) being connected with each other, said master unit comprising:

a plurality of storing circuits (FF1, FF2, FF3, FF4) which respectively store transmission request signals representing transmission requests from respective slave units (SU0, SU1, SU2, SU3);

a transmission allowance signal generating circuit (13), connected to the plurality of storing circuits, for generating a transmission allowance signal representing the transmission allowance of only one slave unit (SU0, SU1, SU2, or SU3) according to output signals received from the plurality of storing circuits indicating stored contents of said plurality of storing circuits (FF1, FF2, FF3, FF4) and a predetermined priority order;

transmission request rewriting circuits (51, 52, 53, 54) each coupled to a respective storing circuit, for rewriting the stored contents of a respective storing circuit (FF1, FF2, FF3 or FF4) which stores the transmission request signal from the respective slave unit (SU0, SU1, SU2 or SU3), which has been allowed to transmit data based upon a signal from said transmission allowance signal generating circuit (13), into a state where there is no transmission request;

a detecting circuit (50), coupled to said storing circuits, for detecting a predetermined state where there is no transmission request obtained by rewriting all of the stored contents of said plurality of storing circuits (FF1, FF2, FF3, FF4);

selecting circuits (SEL1, SEL2, SEL3, SEL4) each being respectively connected to a respective one of the plurality of storing circuits and also to a respective one of the transmission request rewriting circuits, for selecting either a rewriting operation performed by a respective transmission request rewriting circuit (51, 52, 53, 54), or a signal input operation causing the transmission request signals from the respective slave units (SU0, SU1, SU2, SU3) to be stored in respective storing circuits (FF1, FF2, FF3, FF4); and a control circuit (NAND 1) having an output connected to each of said selecting circuits (SEL1, SEL2, SEL3, SEL4) and an input connected to receive an input signal from said detecting circuit for transmitting a signal to select either said signal input operation only when said predetermined state is detected by said detecting circuit or said rewriting operation when said predetermined state is not detected by said detecting circuit, wherein said detecting circuit (50) comprises an AND gate (AND5) receiving all outputs of said plurality of storing circuits (FF1, FF2, FF3, FF4) as inputs thereof; and a flip-flop (FF5), coupled to said AND gate, for storing and outputting the outputs of said AND gate (AND5).

5. A data transferring apparatus as set forth in claim 4, wherein said control circuit (NAND1) controls said selecting circuits (SEL1, SEL2, SEL3, SEL4) according to a signal (LP) supplied thereto at a predetermined timing and an output (S1) of said flip-flop (FF5).

* * * * *